W. M. FULTON.
HEAT REGULATING MEANS.
APPLICATION FILED JULY 10, 1916.
1,349,058.
Patented Aug. 10, 1920.
2 SHEETS—SHEET 1.
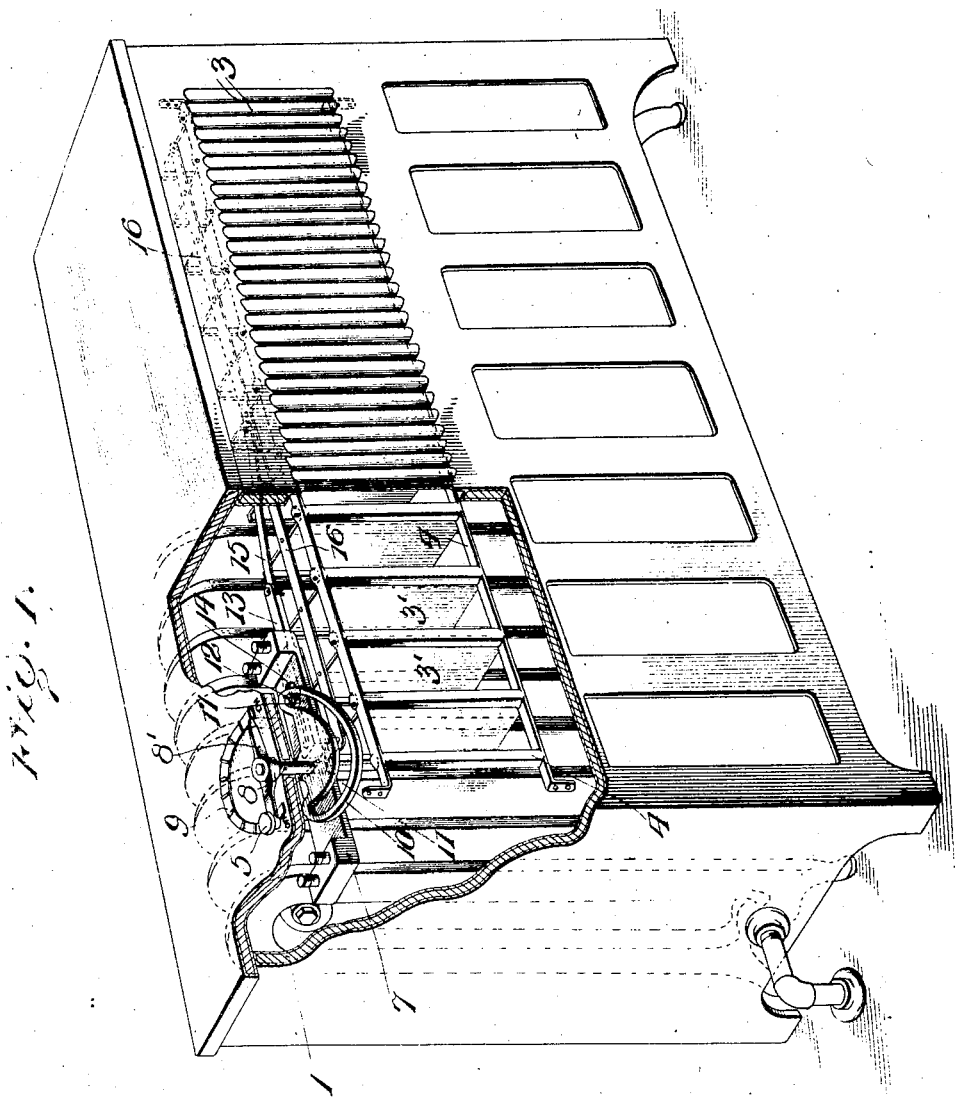
Inventor
Weston M. Fulton
By
Mauro, Cameron, Lewis & Massie
Attorneys

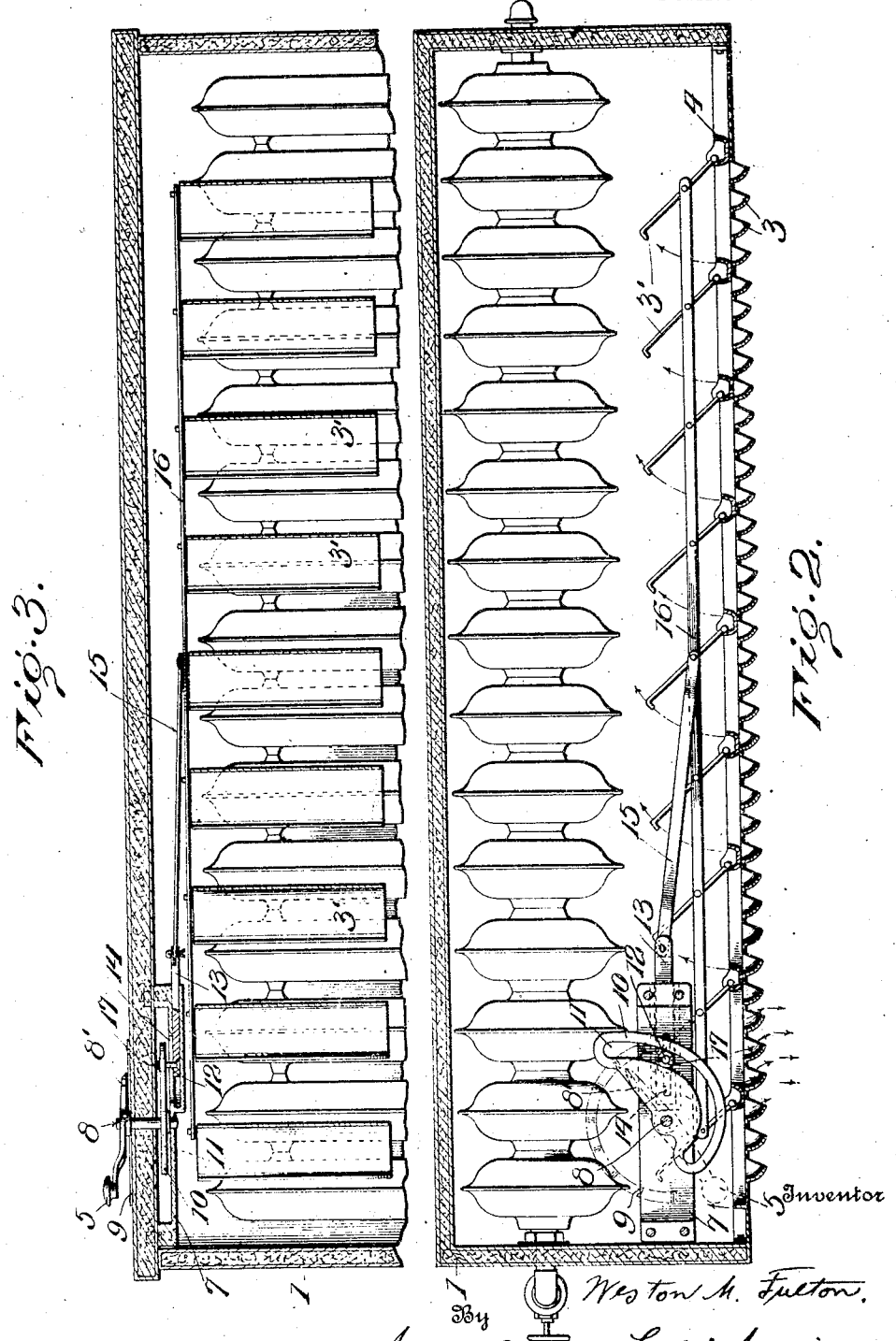

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

HEAT-REGULATING MEANS.

1,349,058.

Specification of Letters Patent.   Patented Aug. 10, 1920.

Application filed July 10, 1916.   Serial No. 108,492.

*To all whom it may concern:*

Be it known that I, WESTON M. FULTON, a citizen of the United States of America, and a resident of Knoxville, Tennessee, have invented a new and useful Improvement in Heat-Regulating Means, which invention is fully set forth in the following specification.

This invention relates to heat regulating means and, more particularly, to damper-operating and heat-indicating means, the same having especial utility when applied to the control of the dampers of a radiator casing although capable of use in other relations.

Radiator casings have heretofore been provided with manually operated dampers and with an index hand and a scale coöperating therewith for indicating the extent to which the dampers are opened, but in the arrangements heretofore provided the scale readings are of little or no value for indicating the quantity of heat delivered to the room, since the heat delivered from an inclosed radiator, through damper-controlled openings, has no simple relation to the position of the dampers, particularly when they are pivotally supported.

The rate of increase or decrease of heat delivered to the room through damper controlled openings for different positions of the dampers depends on factors which are variable, and in the present state of the art can only be approximately determined. For example, the rate of increase of heat delivered through the damper openings falls off as the dampers of the casing are opened, since the rate of flow of the air depends on the difference in temperature between a column of air inside the casing and an equal column outside the casing, and this difference in turn varies with the time during which the air is held in heat interchanging relation with the radiator sections, being less the wider the dampers are opened. The scale readings are further rendered inaccurate as a guide to the heat delivered due to variable conduction effects through the walls of the casing. When the dampers are nearly or entirely closed, the difference in temperature between the air within the casing and that on the outside increases, and an increased proportion of the heat given off by the radiator finds its way through the casing and lagging by conduction, and may amount to as much as fifteen per cent. of the total heat given off by the radiator. Furthermore, with pivotally mounted dampers, equal increments of angular movement of the dampers is not accompanied by equal increments in the effective opening provided for the escape of heated air.

The object of my invention is to overcome the above objections, and the invention as applied to a radiator casing resides in providing means, associated with the manual damper-operating means and the indicating means, for correlating the movements of the dampers with those of the indicating means, so that the heat delivered by the incased radiator in the different positions of the dampers will correspond, with substantial accuracy, with the readings of the indicating means. In the form shown, the readings on a scale of equal divisions are made to correspond with damper positions whereby substantially equal increments of heat are supplied by the incased radiator in conformity with equal movements of a pointer over said scale. In the form illustrated I provide a cam, preferably located on the shaft on which is mounted the damper-operating handle and which moves the index hand. This cam is provided with a cam surface engaging the damper-operating member or rod, and determines the extent of movement of the dampers in respect to the readings on the index scale. The proper curvature of the cam surface is determined by calibration with a standard radiator and casing with the dampers in different positions.

In order that the invention may be more readily understood, reference is had to the accompanying drawings which illustrate by way of example one mechanical embodiment of the inventive idea. The drawings are intended to assist the description, and are not intended to define the limits of the invention.

Figure 1 is a perspective view, with parts broken away, of a radiator casing provided with my improvements.

Fig. 2 is a plan view of the same casing with the top removed to show the cam and its connections with the dampers.

Fig. 3 is a vertical longitudinal sectional view through the casing, showing the manner of supporting the cam and its connections.

In the form shown on the drawings, 1 designates a radiator casing, preferably having walls of insulating material, provided with a grille or series of louvers 3 for protecting from view a series of vertical dampers 3' pivotally mounted in a frame 4 supported by the casing wall. 5 is a damper-operating handle located above the top wall of the casing and mounted on a shaft 8 passing through the wall and having a bearing in a supporting bracket 7 which may be secured to the underside of the top wall. Mounted on shaft 8 is an indicating hand 8' adapted to move over a scale 9 shown as graduated into equally spaced divisions, and within the casing on the same shaft is secured a cam 10 provided with a cam slot 11 which receives a pin 12, adjustably mounted in a shifting rod 13 and guided in a slot 14 provided by the bracket. Rod 13 is pivotally connected by a link 15 to a member 16 having suitable connections with the dampers 3' at their central points. To reduce friction, the pin 12 is preferably provided with a friction roller 17.

The operation of the device will be readily understood from the above description. Assume the device to have been assembled and the radiator casing placed over a radiator. When the index hand is opposite 0, the dampers are in closed position and the heat given out to the room is that which is transmitted by conduction through the casing walls. This escape of heat is reduced to a minimum by use of the heat lagged walls. The index scale in the form shown extends through 180°, or through one-half revolution of the shaft, and for convenience is divided into 8 divisions, the extreme positions of the index hand being marked "Off" and "On." The half revolution of the shaft 8 effects a quarter revolution of the dampers by reason of the design of the cam slot. If the hand be moved from "off" position to the first division mark, or through one-eighth of the scale, the dampers will be opened sufficiently to permit the discharge of an amount of heat equal to one-eighth of the total heating capacity of the radiator, taking into account the heat escaping through the walls by conduction. The advance of the index hand to each succeeding mark increases the output by increments of one-eighth till eight-eighths are reached and the dampers are full open. The reverse movement cuts off heat in the same proportion.

It is to be noted that the cam surface determines the relative positions of the dampers with respect to the positions of the index hand along the scale. The markings do not indicate directly the extent of the damper openings.

While I have described my improvement as applied to the control of heat delivered from a radiator casing, I do not desire to limit its use to such locations since it may be applied to the control of dampers in other relations and of fluids through valved conduits where the flow is subject to variations of temperature and pressure within substantially defined limits, permitting of calibration of the cam.

What is claimed is:

1. In combination, a radiator casing provided with one or more dampers, indicating means and a scale graduated to indicate amounts to heat associated with said indicating means, and damper-operating means operatively connected with said indicating means and constructed to move said dampers to supply amounts of heat in conformity with the indications of said first-named means on said scale.

2. In combination, a radiator casing provided with dampers, indicating means and a scale graduated to indicate equal amounts of heat associated with said means, and damper-operating connections between said indicating means and dampers including means for controlling the movements of the dampers to enable the discharge of heat to correspond with the graduations on said scale.

3. In combination, a radiator casing provided with dampers, indicating means and a scale graduated to indicate equal amounts of heat associated with said means, and damper-operating connections between said indicating means and dampers including a cam for controlling the movements of the dampers to enable the discharge of heat to correspond to the graduations on said scale.

4. In combination with a source of heat, an inclosure for confining the heated air, one or more dampers for regulating the escape of heated air from said inclosure, an indicating member and a scale, graduated to indicate amounts of heat, coöperating with said member, a cam movable with said member, and connections between said cam and said dampers, said cam being constructed to so move said dampers as to enable the discharge of heat to correspond to the graduations on said scale.

5. In combination, a radiator casing provided with dampers, an indicating member, a scale graduated to indicate amounts of heat, a cam movable with said indicating member, and connections between said cam and said dampers, said cam being constructed to so move said dampers as to enable the discharge of heat to correspond to the graduations on said scale.

6. In combination, a damper-controlled passage for conveying heating medium, and operating means comprising a cam having connections with said damper and adapted for equal angular movements to move the damper into position to discharge equal amounts of said medium.

7. In combination with a source of heat, an inclosure having one or more dampers for regulating the supply of heat, a scale graduated to indicate the amounts of heat supplied, a pointer coöperating with said scale, and means operatively connected with said pointer for so moving said dampers that the heat supplied is in correspondence with the indications of said pointer on said scale.

8. In combination, a radiator casing provided with one or more dampers, a scale graduated to indicate the amounts of heat supplied, a pointer coöperating with said scale, and a cam operatively connected with said pointer and adapted to move said dampers to correlate the heat supplied to the indications of said pointer on said scale.

In testimony whereof I have signed this specification.

WESTON M. FULTON.